(12) United States Patent
Asmi et al.

(10) Patent No.: US 7,669,070 B2
(45) Date of Patent: Feb. 23, 2010

(54) EFFICIENT COMMUNICATION POWER USAGE

(75) Inventors: Yasser Asmi, Redmond, WA (US); David Walter Proctor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 11/674,896

(22) Filed: Feb. 14, 2007

(65) Prior Publication Data

US 2008/0195879 A1 Aug. 14, 2008

(51) Int. Cl.
*G06F 1/32* (2006.01)

(52) U.S. Cl. .................. 713/324; 713/310; 713/323

(58) Field of Classification Search .................. 713/300, 713/310, 320, 322, 323, 324
See application file for complete search history.

(56) References Cited

U.S. PATENT DOCUMENTS

| | | | |
|---|---|---|---|
| 5,661,665 | A | 8/1997 | Glass et al. |
| 6,064,379 | A | 5/2000 | DeMoney |
| 6,415,326 | B1 | 7/2002 | Gupta et al. |
| 6,625,656 | B2 | 9/2003 | Goldhor et al. |
| 6,757,517 | B2 | 6/2004 | Chang et al. |
| 7,088,774 | B1 | 8/2006 | Moni et al. |
| 7,096,271 | B1 | 8/2006 | Omoigui et al. |
| 2005/0124313 | A1 * | 6/2005 | Simpson et al. .......... 455/343.3 |
| 2005/0266896 | A1 * | 12/2005 | Son et al. .................... 455/574 |
| 2006/0080456 | A1 | 4/2006 | Hur et al. |
| 2006/0211436 | A1 | 9/2006 | Paila et al. |
| 2008/0084941 | A1 * | 4/2008 | Mohanty et al. ............ 375/260 |

FOREIGN PATENT DOCUMENTS

| | | |
|---|---|---|
| EP | 1708456 | 4/2006 |
| GB | 2406483 | 3/2005 |

OTHER PUBLICATIONS

Cui et al., "Layered Peer-to-Peer Streaming," ACM 2003, http://delivery.acm.org/10.1145/780000/776348/p162-cui.pdf?key1=776348&key2=9252652611&coll=GUIDE&dl=portal,ACM&CFID=11111111&CFTOKEN=2222222.
Li et al., "Proxy-driven rate-distortion optimized video streaming over wireless network using asynchronous clocks," http://serrano.cs.ucdavis.edu/publications/2004_rubinet_2005-02-08_12_49_42.pdf.
Chandra et al., "Application-specific network management for energy-aware streaming of popular multimedia formats," The USENIX Association 2002, http://www.usenix.org/events/usenix02/full_papers/chandra/chandra.pdf.

* cited by examiner

*Primary Examiner*—Dennis M Butler
(74) *Attorney, Agent, or Firm*—Marshall, Gerstein & Borun LLP

(57) ABSTRACT

A media player may be adapted to organize and display nearby media device information between communicating media devices before a complete connection is established. In one embodiment, a sleep message is received telling the receiving device to turn off the receiving function for a period of time or until a point in the future to conserve energy.

20 Claims, 3 Drawing Sheets

EFFICIENT COMMUNICATION POWER USAGE

BACKGROUND

This Background is intended to provide the basic context of this patent application and it is not intended to describe a specific problem to be solved.

Digital media players are in common use among a broad base of users. Presently, streaming digital media is available over both wireless and wired networks and may be displayed on cellular telephones and other portable media devices. Media players may send and receive content over a variety of data networks including cell-based and isochronous networks. The IEEE 802 standard family describes various local and wide-area networks (LAN and WAN, respectively) that carry variable-sized packets encoding digital media. The 802 standard encompasses protocols for both wired (e.g., 802.3, or Ethernet) and wireless (e.g., 802.11, or "WiFi") networks. The 802.11 standard describes the protocols used to transfer data when a device is connected to a wireless network.

The station is the most basic component of the wireless network and is any device that contains the functionality of the 802.11 standard and a connection to the wireless media. Typically the 802.11 functions are implemented in the hardware and software of a network interface card (NIC). A station could be a media player, a laptop PC, handheld device, or an Access Point. Stations may be mobile, portable, or stationary and all stations support the 802.11 station services of authentication, de-authentication, privacy, and data delivery. A collection of any number of stations is called a Basic Service Set (BSS).

To connect to a network, devices typically perform an authentication and association process. Before communicating any data, clients and access points must establish a relationship, or association. Typically, however, only after association may devices exchange data. In the Infrastructure Basic Service Set, clients first associate with an access point. However, in an ad-hoc topology, devices must associate with other devices. To associate, the communicating devices exchange messages called management frames. All wireless devices transmit a beacon management frame at a fixed interval and a client listens for beacon messages to identify the devices within range. The client then selects the BSS to join based on the information contained in the management frame. A client may also send a probe request management frame to find an access point affiliated with a desired network name. After identifying an access point, the client and the access point perform a mutual authentication by exchanging several management frames as part of the process. To become authenticated and associated, the client sends an association request frame, the access point responds with an association response frame, and the process is complete.

A media player acting as a client or station must accomplish the similar authentication and association steps to communicate on the network. However, a media player user may only wish to connect and communicate with compatible or similar media players. A media player user may, therefore, have only a limited indication of the device type and no indication of the type or content of the device's data until the connection process is complete. In addition, constantly keeping the communication function operating may be inefficient and may waste energy as broadcasts of interest to the receiver may only occur during a few limited windows of time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A media player may be adapted to organize and display nearby media device information sent between communicating media devices before a complete connection is established. The media player may turn off its receiving function for a period of time to conserve energy. The media player may receive a message that tells it how long to turn off (or sleep) its receiving function or the message may tell the device when to turn its receiving function back on. The media device may be a handheld device, a virtual player on a computer, a set-top box, a cellular telephone, or other device capable of supporting media objects, a user interface, and, in many cases, external communication.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
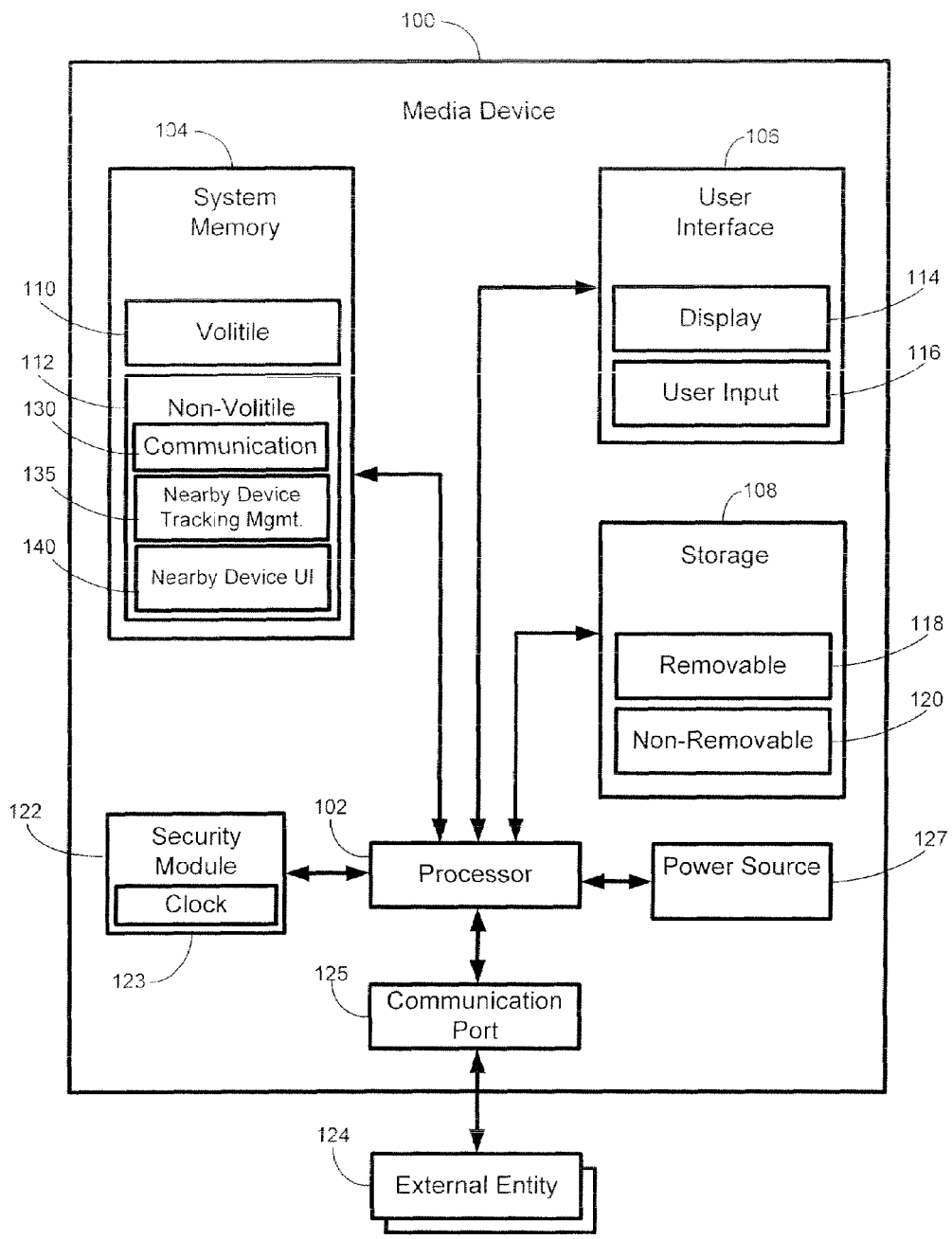
FIG. 1 is an illustration of hardware for a portable media device.

FIG. 1 is an illustration of exemplary hardware that may be used for a media device 100 that may track and organize other nearby media devices. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media device 100 may also include additional storage 108 (removable and/or non-removable) including, but not limited to, magnetic or optical disks or tape or any other memory that can be easily rewritten, may keep data for long periods of time when power is removed, and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of device 100.

The processing unit 102 may be any processing unit 102 capable of executing computer code to decode media data from a compressed format into a useable form fast enough such that music and video may be played continuously without skips or jumps. When in a portable media device, it may also be useful if the processor 102 efficiently uses power to increase the life of the power source. The processing unit 102 may also be used to execute code to support a user interface and external communications.

The user interface may include one or more displays 114 for both displaying control information and displaying viewable media. The display 114 may be a color LCD screen that fits inside the device 100. User input(s) 116 may include manual buttons, soft buttons, or a combination of both. In addition, the user input may be gesture driven which may use no buttons or may be voice activated. Soft buttons may be used when the display 114 includes a touch screen capability. Manual buttons may include re-definable keys with programmable legends.

A security module 122 may be coupled to the processor. The security module 122 may be used to store cryptographic keys used in digital rights management (DRM). The security module 122 may also have specialized hardware or processors for performing cryptographic calculations, such as stream decryption, without burdening the processor 102. Lastly, the security module 122 may include secure memory for storing record data associated with limited use rights for received media objects. The security module 122 may also include a tamper resistant clock for determining expiration periods on licenses.

The media device 100 may also contain communications port or connection(s) 125 that allow the device 100 to communicate with external entities 124, such as network endpoints, other media devices, network access points, or a computer used for synchronization. Communications connection (s) 125 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The power source 127 may be a battery that may be rechargeable, and other power sources are possible.

A variety of functions, implemented in logic or software, may be used to support tracking and organizing nearby media devices 100, 124. Such functions may include a communication module 130, a nearby device tracking management module 135, and a nearby device tracking user interface 140 that may facilitate user interaction related to tracking, authenticating and organizing nearby devices.

In operation, a user may connect to external entities 124 through a variety of network types to include local and wide area networks using any number of communication protocols and standards. For example, a media device may connect to a network implementing any of the Ethernet, ARCNet, FDDI, IEEE 1394, Token Ring, USB, Web Services, MTP or TCP/IP standards and protocols. Media devices may connect to each other through a central access point or in an ad hoc fashion. Once connected, the devices may share and transfer data files including media content. A user may receive a media object, including, for example, music or video content, text or audio-based books, electronic games, photos, audio message, video messages or virtually any computer-based file or collection of files, over the communication port 125. In one embodiment, the media object may be sent over an ad-hoc wireless network from an external device 124. To illustrate, the media object may have been purchased for use on the external device 124 and the user of the external device 124 may be entitled to full and unlimited access to that media object using that device. The user of the external device 124 may wish to share the media object with a user of the media device 100 and may forward the media object to the media device 100.

Figure 2:
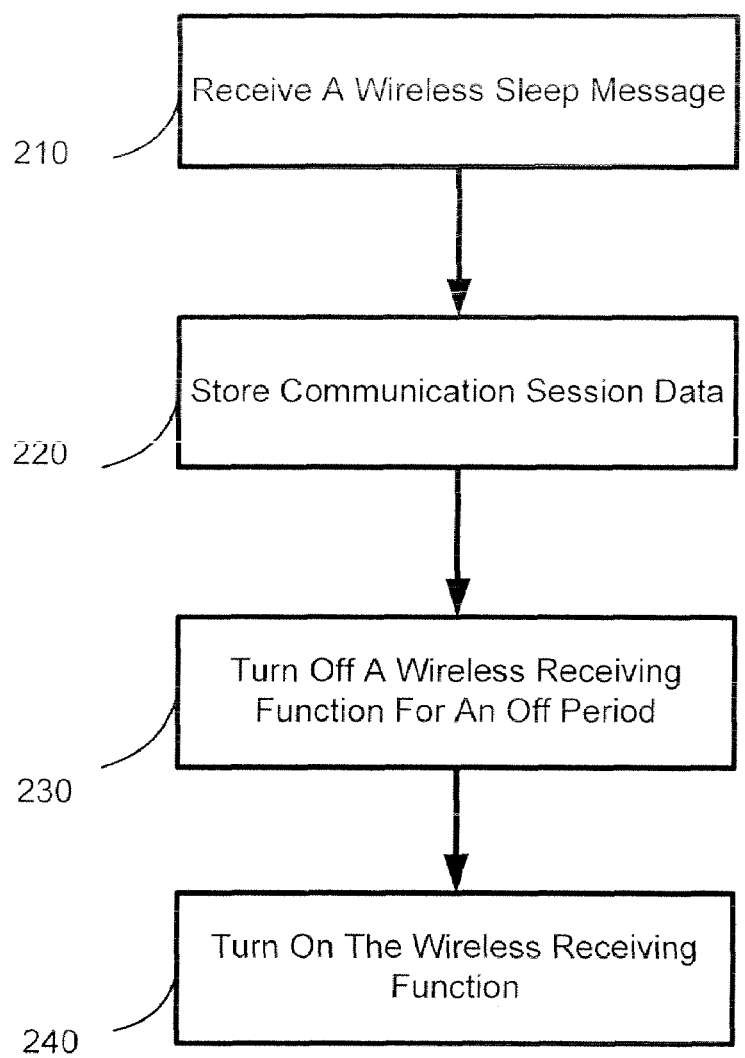
FIG. 2 is a flow chart of a method of efficient communication usage to save energy in a media device.

FIG. 2 may illustrate a method designed to save power in a portable media device 100 by turning off the wireless receiving function, the wireless sending function or both functions for a period of time while awaiting further communication. The method may function between portable media players or between a portable media player and another source such as a wireless base station.

At block 210, a wireless sleep message may be received. The wireless sleep message may instruct the receiving device that another message will not be arriving for a given period of time. In one embodiment, the device communicating the sleep message 124 will have knowledge of when the next communication will occur. With this knowledge, the device 124 may be able to tell the receiving device 100 the amount of time it should turn off the receiving function. The amount of time may virtually anytime, not solely a certain number of predefined intervals.

The sleep message may be used in a variety of situations where communications to the media device are occurring. The sleep message may be a dedicated message that is recognized as a sleep message. The sleep message may be part of a data transfer message. As described below, the sleep message may be embedded as data in an announcement message as illustrated and described in FIG. 3.

The announcement 300 may be any message that may organize and synchronize communication between the devices 100, 124 as well as provide information about the sending device 124 to the receiving device 100. In one embodiment, the announcement 300 is communicated to any nearby device as a frame, such as a beacon management frame or a probe request management frame. In still another embodiment, the announcement is communicated as part of the authentication process employed by devices attempting to connect using the 802.11 standard. The announcement 300 may include data such as a time stamp 310 from the secure clock 123 of the device security module 122, frequency-hopping spread spectrum (FHSS) and direct sequence spread spectrum (DSSS) parameters 315, an identification or name of the network (SSID) 320, a traffic indication map (TIM) 325, and supported data transmission rates 330.

In another embodiment, the announcement 300 includes a sending device 124 profile 335. For example, the sending device profile 335 may include data related to the specific device 124 and may include network interlace card (NIC) address, a unique device identifier, a firmware or software version number, a device type, a total storage capacity, a remaining storage capacity, an activation date, a manufacturing date, or any other data related to the specific sending device 124. A unique device identifier may be a Globally Unique Identifier (GUID). The GUID may be based on the external device's NIC address and time stamp 310 or may be generated in any other suitable manner.

Media characteristics 340 may also be included in the announcement 300. In one embodiment, media characteristics are related to media objects stored or being processed by the device 124. Of course, other embodiments of media characteristics are possible. Other announcement 300 information may include sender profile 345 data. For example, the sender profile may include a unique sender identifier, demographic data associated with the sending device 124 user, profile data associated with users of different external devices 125 that the sending device user has identified as "trusted" or has otherwise classified, or other users connected to the external device 124. The sender profile 345 may also include a name that may be set by the user to personally identify him or herself to other connected devices. Of course, sender profile data could include a variety of additional information. The announcement may include a welcome message 350 that may be customized by an external device 124 user at the time the announcement 300 is sent or may be set by the user previously. The message may be sent to other devices 100 as part of an announcement 300, alone, or as part of other communications.

The data included in the announcement 300 may be determined by the external device 124 prior to sending. In one embodiment, the external device 124 may include privacy settings 355 that may be part of the announcement 300. For example, the privacy settings 355 on the sending external device 124 may restrict the amount of data that is included in the announcement 300 before it is sent to other devices 100. Privacy settings 355 may also allow sending or viewing the user's activity related to a radio station, photos on his device, may provide information indicating that the external device 124 is not currently engaged in any activity or that the device is in a power save mode. Of course, many embodiments of the announcement 300 are possible.

Figure 3:
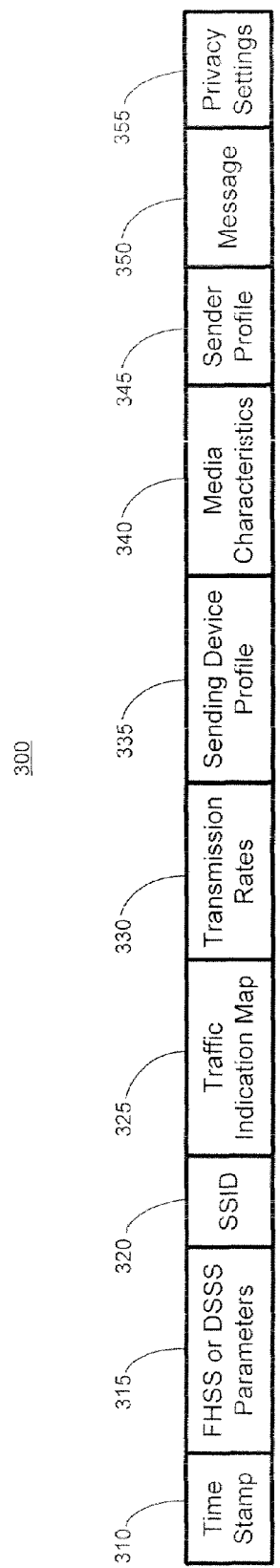
FIG. 3 is a block diagram of an announcement message passed between connecting media devices.

The generation of the sleep message may occur in a variety of ways. In one embodiment, a user selects to be in a power save mode on the media player 100. The power save selection is communicated to other users and the other users may then instruct the media player 100 when it would be appropriate to turn off the communication functionality of the media player 100. For example, the power save selection may be part of the device profile 335 (FIG. 3). In another embodiment, the default value is that the sleep mode is used whenever possible. In yet another embodiment, the sleep mode is used when power of the media player 100 is below a threshold, such as when a battery is running low. Of course, other ways to engage the sleep function are possible.

In implementation, the sleep message may be as simple as a flag set in a message header where the flag may indicate that the receiving media player 100 should stop receiving for a predetermine amount of time or sleep time. In another embodiment, the message contains data that specifies the amount of time (sleep time) the receiving media player 100 should stop receiving. In yet another embodiment, the message may communicate to the receiving device 100 that it should stop receiving until a specific time in the future.

In one embodiment, the sleep message is a form of a 802.11 probe request packet. The sleep message contains two special values: 1. A sleep operation code; and 2. A sleep interval in milliseconds. The following is an example of code that contains a description of commands used in sleep mode.

OID_MS_802_11_ALLOW_SLEEP_MODE
define OID_MS_802_11_ALLOW_SLEEP_MODE 0xFF000010
When set TRUE, allow WLAN to enter into sleep mode
Actually WLAN enters into sleep mode after receiving sleep-broadcast packet from ad-hoc former.
This object identifier ("OID") is available only with an ad-hoc mode.
Type
Set
Input Type
BOOL
Output Type
N/A
OID_MS_802_11_SLEEP_BROADCAST
define OID_MS_802_11_SLEEP_BROADCAST 0xFF000011
Description
WLAN sends sleep-broadcast packet included Sleep Interval.
(Own driver does not enter into power save mode)
This OID is available only with an ad-hoc mode.
Type
Set
Input Type
ULONG //Sleep Interval
Output Type
N/A
OID_MS_802_11_SLEEP
define OID_MS_802_11 SLEEP 0xFF000012
Description
Own WLAN driver enters into power save mode during specified Sleep Interval.
This OID is available only with an ad-hoc mode.
Type
Set
Input Type
ULONG //Sleep Interval Output Type

N/A

Of course, many embodiments of the message are possible.

The wireless sleep message may also contain a time synchronization element. As the receiving player 100 may be told to turn off or sleep until a time in the future (or for a period of time) and sending will begin after this period of time, in order to not miss a communication, keeping synchronized time with a sending player 124 is important. Other methods of keeping synchronized time are available.

The given period time until the next communication may be created taking into account the data flow rate and the time necessary to restart the wireless receiving function. For example, there may be an ideal data burst size that is efficient for a sender. The receiver may receive sufficient data to play for several seconds so receiving data continuously may not be efficient. Accordingly, a burst may be sent to provide music for five second and it may take one second to deliver this music data. As a result, in an ideal situation, the receiving function may be on for one second and off for four seconds, in reality, there may be some time required to shut down the receiving function and start the receiving function again.

In another embodiment, the sleep time is the period of time it will take to playback the media that has already been received and buffered ahead of playtime. In a further embodiment, the sleep time is the minimum playtime of the already buffered media or the shortest time interval that is desired for the receiving device to respond to changes from the transmitter. For example, a change that would require a response would be a Pause or Next Track on the transmitter. In this case, if the receiver had 5 seconds of audio buffered, it might still only sleep for 100 msecs if it is desired that the receiver be able to check for pause events more frequently.

An acknowledgment may be communicated from the receiving device 100 that the sleep message (which communicated that another message will not be arriving for a given period of time or until a time in the future) has been received by the sending device 124. In this way, both devices 100, 124 know that the respective communication functions may be turned off. In some situations, the acknowledgement may not be sent as it may not be desirable or necessary to turn off the communication function. For example, if the portable media device is connected to a non-battery power source, the need to turn off the receiving function is minimal and the acknowledgement may not be sent. In another example, if the portable media device 100 is receiving communications from more than one sender, the receiving media player 100 will desire to keep receiving from all the senders, meaning that the receiving function may not be turned off. In such cases, if the wireless function will not be turned off, an acknowledgement may not be communicated. Of course, there may be a wide variety of reasons that the portable device may not want to turn off its receiving function.

In some embodiments, a user notification occurs when the wireless functionality has been disabled. For example, a symbol may be displayed that the wireless functionality has been disabled. Other possible manners of notification are possible such as noises, vibrations, highlighting, etc. Similarly, when the sleep time is over, a notification may occur that the wireless functionality is operating again.

At block 220, communication session data may be stored related to the device that communicated the sleep message. For example, communication session data such as identification data and channel data of the sending device may be stored and the most recent packet id may be stored. Any data, such as the data described in FIGS. 3 and 4 may be stored. By saving this data, the authentication process at wakeup or the end of the sleep period may be reduced. For example, by matching the sender id, which may be a GUID, the "waking up" device may assume the communication is as expected and should begin without further authentication. As explained in relation to FIG. 3, the initial data required to be exchanged and verified for establishing trusted communication between two devices may be quite extensive. By minimizing this process, quicker "sleeps" and "wake-ups" may be possible which may save even more energy and may allow the sleep function to operate more seamlessly.

At block 230, a wireless receiving function may be turned off for a sleep period or off period in the receiving device 100. The clock in the security module 122 may be used to keep track of the passing time. The communicating device 124 may be able to predict the amount of time that will pass until it needs to communicate with the receiving device 100 again. In one embodiment, the sleep period is less than or equal to the given period of time. Referring to a previous example, if it takes one second to send five seconds of music, in an ideal world, the receiving function may be turned off for four of the five seconds while the communication burst occupies the remaining one second. In reality, there is overhead involved in turning the receiving function on and off so it may be advisable to make the sleep time smaller.

In one embodiment, even though the receive function is turned off, the send function in the receiving device 100 may continue to operate. In this way, the portable media device 100 may still be discovered by other devices but the portable media device 100 may still be conserving energy by turning off the receiving function. In other embodiments, the entire communication function in the receiving device 100 may be disabled to save energy. This may be an intelligent decision by the portable media player 100, such as when no devices have been noticed as being nearby for a significant period of time. In such cases, the entire communication function may sleep. In another embodiment, the user is given the option to enable or disable the energy saving function of turning off part or all of the communication functions.

At block 240, the wireless receiving function may be turned on after the expiration of the sleep time. In another embodiment, the wireless receiving function may be turned on at a predetermined time in the future. In another embodiment, the receiving function is periodically turned on. In this way, if there was a miscommunication or yet another device is trying to connect to the portable media player, the communication may be completed. Other manners of determining when to turn on the wireless receiving function are possible.

In another embodiment, a separate device that operates using very little power may be attached to the media player 100 and this device may stay "awake" to receive a wake up event wirelessly. In one embodiment, the separate device has its own power supply. If a wake up event occurs, the separate device may act like a sort of relay and wake up the communication function on the media player 100. As a result, the power supply for the media player 100 will be drained less than if the receiving function on the media player 100 had to stay awake.

The portable media device 100 may turn on the wireless receiving function and beginning reception by entering into a same receiving mode that was turned off. This may be accomplished in a variety of ways. In one embodiment, the stored communication session data that was stored such as the identification data, channel data and the most recent packet id from the sending device may be matched to the received packets. If the received packets contain the expected data such as the same sender id as the stored sender is, using the same channel as the stored channel, and the packet number is the expected packet number in view of the stored packet, the usual authentication process may be minimized. As an example, the authorization process may be abbreviated or eliminated so long as the expected next packet is received, such as when the first received packet after wakeup contains a sender id that matches the stored sender is and the packet id is the expected packet id in relation to the stored packet id. In another embodiment, the sending device profile 335 (FIG. 3) and time stamp 310 are reviewed and if the sending device profile 335 matches and the time stamp 310 is as expected, authentication is complete. Of course, other manners are turning on the wireless function (or functions) are possible.

In addition, if the received packet is the expected packet and authorization is obtained, the normal transmission of data may commence. If the packet is not the expected packet or other quick authorization data does not match, the receiving function may remain on and further packets may be reviewed on the media player 100 to determine is the expected packet from the expected user is present. After a period of time, the media player 100 may stop looking for the expected packet and the player may return to normal operation.

In one embodiment, the packet is processed only if it arrives from a validated source. This is done by ensuring that the hash in the custom information element of the packet is validated. The validation uses a portion of the custom information element which is encrypted using a "preshared" key which is used to perform the hash. Of course, other embodiments are possible.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

We claim:

1. A method of conserving power in a portable media device that receives messages from a sending device comprising:
    receiving a wireless sleep message wherein the wireless sleep message is a sending device-initiated message that instructs the portable media device that another message will not be arriving for a given period of time;
    storing communication session data related to an in-progress data communication session from the sending device that communicated the sleep message;
    turning off a wireless receiving function in the portable media device for a sleep period wherein the sleep period is less than or equal to the given period of time; and
    turning on the wireless receiving function in the portable media device after the sleep period.

2. The method of claim 1, wherein turning on the wireless receiving function in the portable media device after the period of time further comprises entering into a same receiving mode that was turned off.

3. The method of claim 1, further comprising allowing a sending function in the portable media device to operate.

4. The method of claim 1, further comprising disabling the turning off of the wireless receiving function when the portable media device is connected to a non-battery power source.

5. The method of claim 1, further comprising disabling the turning off of the wireless receiving function when the portable media device is receiving communications from more than one sender.

6. The method of claim 1, further comprising communicating from the portable media device an acknowledgment that the wireless message that another message will not be arriving for the given period of time has been received.

7. The method of claim 6, further comprising if the wireless receiving function cannot be turned off, not communicating an acknowledgement from the portable media device.

8. The method of claim 1, further comprising periodically turning on the receiving function in the portable media device.

9. The method of claim 1, further comprising using the stored communication session data to assist turning on the wireless receiving function in the portable media device.

10. The method of claim 1, wherein the wireless sleep message further comprising a time synchronization element.

11. The method of claim 1, wherein the given period of time is created taking into account the data flow rate and the time necessary to restart the wireless receiving function in the portable media device.

12. A media device for use with bundled media content in communication with a sending device comprising:
    a network card for wirelessly transmitting communications and data from the media device and wirelessly receiving communications and data from the sending device;
    a memory coupled to the network card for storing the communications and data from the sending media device;
    a processor coupled to the network card and the memory for executing computer executable code, the processor being configured according to the computer executable code, the computer executable code comprising code for:
        receiving a wireless sleep message from the sending device wherein the wireless sleep message instructs the media device that another message will not be arriving for a given period of time;
        storing data regarding a current data communication session between the sending device and the media device;
        turning off a wireless receiving function in the network card for a sleep period when the device is operating on battery power only, wherein the sleep period is less than or equal to the given period of time; and
        turning on the wireless receiving function in the network card after the sleep period using the stored communication session data to assist turning on the wireless receiving function to restore the current data communication session.

13. The media device of claim 12, the computer executable code further comprising code for disabling turning off the wireless receiving function when the receiving media device is receiving communications from more than one sender.

14. The media device of claim 12, wherein the wireless sleep message further comprising a time synchronization element.

15. The media device of claim 12, the computer executable code further comprising code for communicating an acknowledgment from the receiving device that the wireless message that another message will not be arriving for the given period of time has been received.

16. A computer readable storage medium configured in accordance with computer executable instructions, the computer executable instructions comprising code for:

receiving a wireless sleep message at a receiving device incorporating the computer-readable storage medium, wherein the wireless sleep message instructs the receiving device that another message will not be arriving for a given period of time;

storing data regarding a communication session between a source of the wireless sleep message and the receiving device including a sender id and a last packet id;

turning off a wireless receiving function in the receiving device for a sleep period wherein the sleep period is less than or equal to the given period of time; and turning on the wireless receiving function in the receiving device after the sleep period using the stored communication session data to assist turning on the wireless receiving function.

17. The computer readable storage medium of claim 16, further comprising code for disabling turning off the wireless receiving function if the receiving device is connected to a non-battery power source or-if the receiving device is receiving communications from more than one sender.

18. The computer readable storage medium of claim 16, further comprising code for communicating an acknowledgment from the receiving device that the wireless message that another message will not be arriving for the given period of time has been received.

19. The computer readable storage medium of claim 16, wherein the wireless sleep message further comprising a time synchronization element.

20. The computer readable storage medium of claim 16, wherein authentication associated with turning on the wireless receiving function and subsequently re-establishing the communications session after the sleep period is abbreviated if the first received packet contains a sender id that matches the stored sender id and the packet id is the expected packet id in relation to the stored packet id.

* * * * *